June 19, 1951  F. H. PERRY  2,557,890
SKEWER FOR HOLDING ROLLED ROAST
Filed Sept. 22, 1948
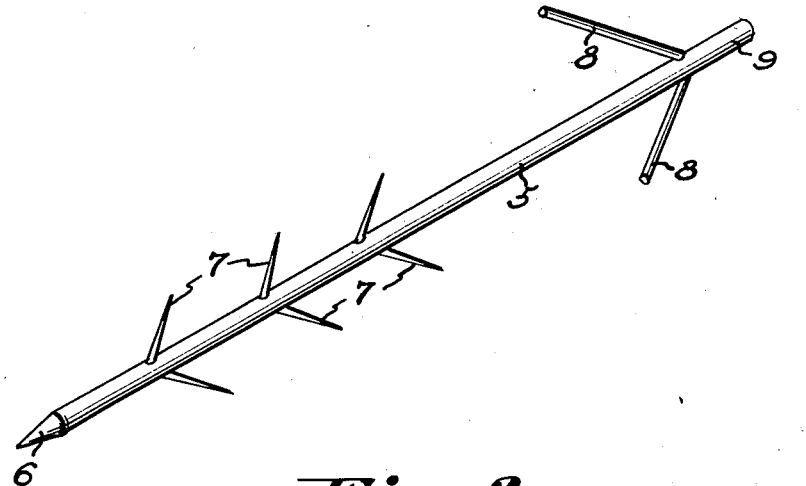
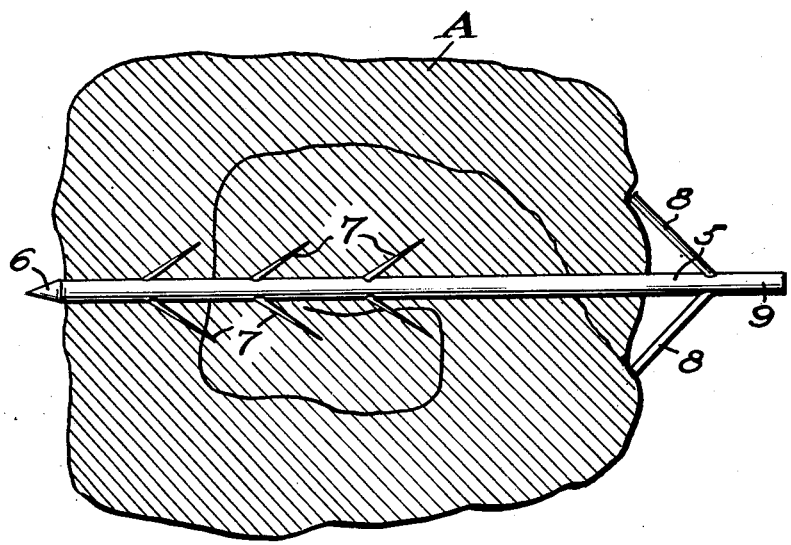
Inventor
Fred H. Perry
By
Attorney Patented June 19, 1951

2,557,890

UNITED STATES PATENT OFFICE 2,557,890

SKEWER FOR HOLDING ROLLED ROAST

Fred H. Perry, Faust, N. Y., assignor of one-half to Oscar Woulf, Tupper Lake, N. Y.

Application September 22, 1948, Serial No. 50,474

1 Claim. (Cl. 17—1)

The present invention relates to improvements in skewers for holding rolled roast and other meats together while cooking.

An important object of the invention is to provide an elongated barbed skewer pin, capable of being easily inserted into rolled meat for holding the meat in rolled form, while being cooked.

Another important object of the invention is to provide an improved skewer capable of being manufactured and retailed at a nominal price.

These and various other objects and advantages of the invention will become apparent to the reader of the following description.

In the drawing:

Figure 1 is a perspective view of the device;

Figure 2 is a sectional view through a piece of rolled meat, showing the present invention in side elevation.

Referring to the drawing, wherein like numerals designate like parts, it can be seen that numeral 5 denotes an elongated pin, pointed at one end as at 6.

From a midpoint toward the point 6, are backwardly slanting tines or barbs 7, while slightly inwardly of the other end of the pin 5 is a pair of obliquely disposed arms 8, 8, which of course serves to stop the skewer, when the same has been inserted sufficiently far into the meat, this use being illustrated in Figure 2.

The portion of the pin 5 beyond the arms 8, defines a handle portion 9.

In the use and operation of this device, the portion 9 is grasped, and the pointed end 6 inserted into the meat A, after the same has been rolled to substantially the form shown in Figure 2.

The pin 5 is then forced through the meat, as shown in Figure 2, the arms 8, 8 stopping the pin at a certain extent, so as to leave the portion 9 protruding, to serve as a handle.

The backwardly pointed barbs 7 prevent return of the skewer, from the meat, while of course the arms 8, 8 serve to prevent further penetration of the skewer into the meat, thus locking the skewer, in the position shown in Figure 2, so that there is no possibility of the skewer becoming displaced.

The skewer can be made of any desired material, wood, metal or in fact various known materials.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A skewer for holding rolled meat together comprising an elongated pin, pointed at one end, and a plurality of pairs of diametrically opposed backwardly and angularly extending spaced prongs disposed on the pin from the pointed end inwardly, and a stop structure on the opposite end of the pin, said stop structure being located inwardly of the adjacent end of the pin, with that portion beyond the stop structure defining a handle, said stop structure being composed of a pair of diametrically opposed angularly and forwardly directed arms.

FRED H. PERRY.

REFERENCES CITED

The following references are of record in the file of this patent:

UNITED STATES PATENTS

| Number | Name | Date |
|---|---|---|
| 38,365 | Goodrich et al. | Apr. 28, 1863 |
| 504,777 | Fischer | Sept. 12, 1893 |
| 816,026 | Meier | Mar. 27, 1906 |
| 1,113,929 | Brown | Oct. 13, 1914 |

FOREIGN PATENTS

| Number | Country | Date |
|---|---|---|
| 19,519 | Great Britain | 1906 |